United States Patent [19]

Jandl

[11] Patent Number: 5,097,578
[45] Date of Patent: Mar. 24, 1992

[54] FILE OR RASP FOR A POWER TOOL
[75] Inventor: Wilheim Jandl, Aadorf, Switzerland
[73] Assignee: Baiter AG, Switzerland
[21] Appl. No.: 459,999
[22] Filed: Jan. 2, 1990
[30] Foreign Application Priority Data
Jan. 4, 1989 [CH] Switzerland ............... 026/89
[51] Int. Cl.⁵ ............................................. B23D 71/06
[52] U.S. Cl. ............................................. 29/78; 29/80
[58] Field of Search ................................ 29/78, 80
[56] References Cited
U.S. PATENT DOCUMENTS

| | | | |
|---|---|---|---|
| D. 123,184 | 10/1940 | De Cesare | 29/78 |
| 371,451 | 10/1887 | Dahms | 29/78 |
| 408,926 | 8/1889 | Palmer | 29/78 |
| 445,712 | 2/1891 | Dallis | 29/78 |
| 538,396 | 4/1895 | Weed | 29/78 |
| 869,706 | 10/1907 | Hamilton | 29/78 |
| 3,763,531 | 10/1973 | Dancsik | 29/78 |

Primary Examiner—William E. Terrell
Attorney, Agent, or Firm—Speckman & Pauley

[57] ABSTRACT

The body of the file or rasp comprises an L-shaped profile with two flanks arranged at an angle, one flank being longer than the other and the protruding part forming a fitting that can be firmly fixed into the adaptor of a mechanical power tool.

16 Claims, 2 Drawing Sheets

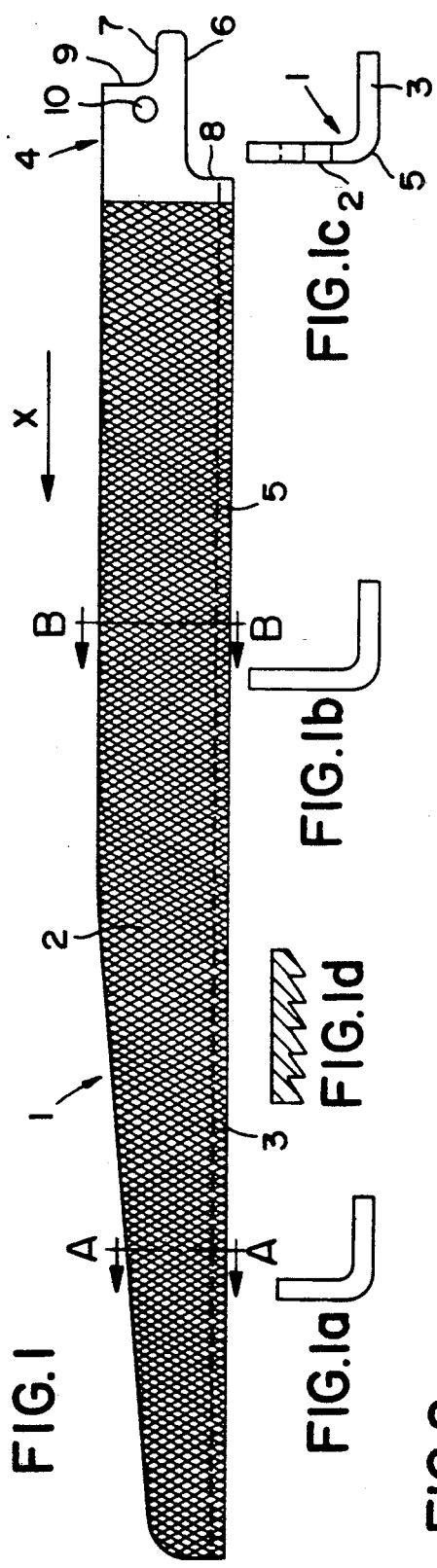
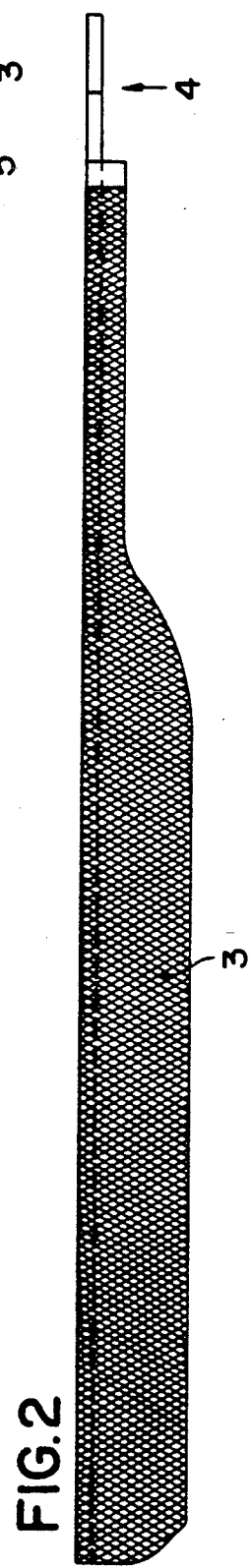
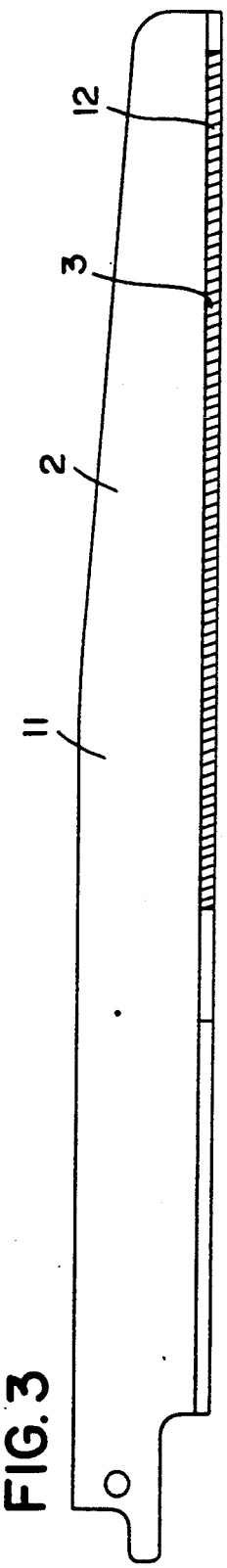

FILE OR RASP FOR A POWER TOOL

BACKGROUND OF THE INVENTION

1. Field of the Invention

The invention relates to a file or rasp that can be used in an electric or pneumatic power tool.

2. Description of the Prior Art

Power tools, with an electrically or pneumatically driven tappet, exist in a variety of different versions and the primary use of those tools, is as power saws. Relatively common are the so-called jigsaws. The saw blade is driven back and forth by the mechanical tappet, perpendicularly to the piece to be cut and the main cutting action takes place on the backstroke of the saw blade. The orientation of the saw teeth is accordingly toward the grip of the tool. A recent innovation is the extending of the stroke of such tools. A known example is the Bosch pad-saw, which operates with a much longer and thicker saw blade and thus, a more stable saw blade. On this mechanical pad saw, the teeth no longer have a preferred orientation, so the cutting process takes place on the forward stroke as well as on the backstroke.

The use of traditional files and rasps presents problems in reduced spaces or for parts that are not easily accessible. These problems are amplified when only short storkes can be used and when the tip of the file cannot be held. The idea was developed, bearing in mind those mechanical saws that allow a cutting action on the forestroke, to design a file that can be used in these tools and thus facilitate the working of hardly accessible parts. A mechanical file or rasp of this kind is not yet known. Since the adapting of such a tool to existing power-saw motors is relatively complicated, such a file or rasp should be designed as a multi-function tool. An additional consideration is that such a tool is subject to different stresses than a traditional, hand-held tool. The hand-held tool is used with relatively slow back-and-forth motions. In the filing action, the tool is held and moved back and forth with one hand, while the pressure is applied by the other hand through the tip of the file. With the mechanical file, on the other hand, the stroke speed is much quicker, and the pressure is applied solely through the grip of the tool. Based on the design adaptations of the existing jigsaws and pad saws, the problem of developing a tool with sufficient stability and compatibility to the adaptors on existing mechanical tools can be solved.

SUMMARY OF THE INVENTION

The main object of the invention is to provide a file or rasp that can be used in an electrically or pneumatically driven mechanical power tool.

The invention achieves this objective with a file or rasp in which the principal distinguishing feature is that the body of the file or rasp comprises an L-shaped profile. One of the flanks of the angle is longer than the other in the axial direction and the protruding part fits into the adaptor of existing power saws.

BRIEF DESCRIPTION OF THE DRAWINGS

Further features of the invention will be apparent from the following more detailed description taken in conjunction with the drawings, wherein:

FIG. 1 is a side view of a file designed according to one embodiment of the invention;

FIG. 1a is a cross-sectional view of the file along line A—A as shown in FIG. 1;

FIG. 1b is a cross-sectional view of the file along line B—B as shown in FIG. 1;

FIG. 1c is a front view of the fitting as seen in the direction of arrow X, as shown in FIG. 1;

FIG. 1d is a partial cross-sectional view of hewn teeth of a file as shown in FIG. 1;

FIG. 2 is a bottom view of the file as shown in FIG. 1;

FIG. 3 is a rear view of the file as shown in FIG. 1 with one dressed or hewn leg;

FIG. 5a is a partial cross-sectional view of hewn teeth; and

DESCRIPTION OF THE PREFERRED EMBODIMENTS

Figure 4:
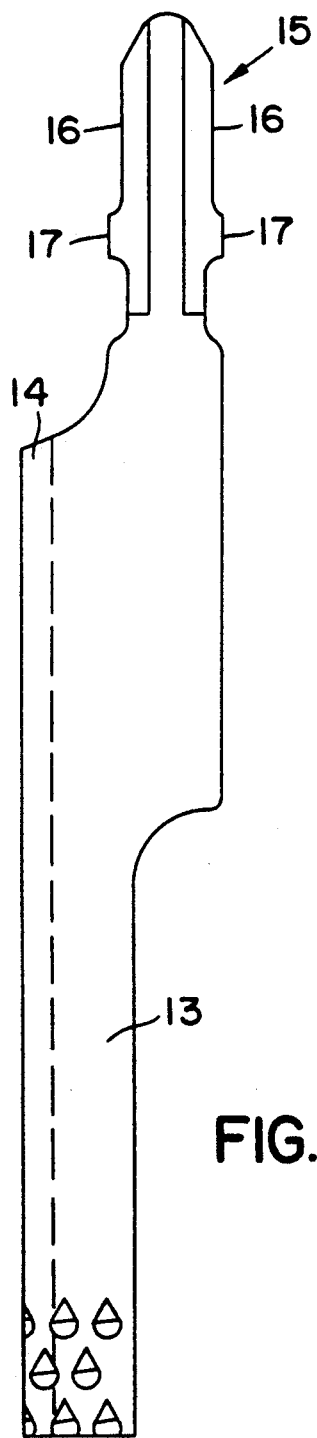
FIG. 4 is a side view of a rasp according to one embodiment of the invention.

FIGS. 1 and 1a-1d show a file, designed according to one embodiment of the invention, as an L-shaped profile 1 with two flanks 2, 3. One flank 2 is longer than the other flank 3 and the protruding part forms a fitting 4 that can be firmly fixed into the adaptor of a mechanical (electric or pneumatic) power tool. The angle shape of the file allows a relatively high lateral loading of the tool while keeping the weight low. The low weight of the file is important to keep the moment of inertia of the moving part low, in view of the high frequency of operation of the tool (500 to 2600 strokes per minute). The two flanks 2, 3 are about perpendicular to each other and are dressed or hewn on the outer side. As shown in FIGS. 1a-1c, the outside edge of the angle is rounded and forms a radius 5. FIG. 1c shows a front view in direction of arrow X in the FIG. 1 of the file. Both flanks 2, 3 and the outer radius 5 are dressed or hewn throughout. The flank 2 shown in FIG. 1 is shaped as a hand-held file and its profile is tapered toward the tip, as can be seen in FIG. 3. FIG. 1d shows the orientation of the hewn teeth.

Flank 2 is longer than flank 3 in FIG. 1, and the extension is shaped into a fitting 4. This fitting 4 has two opposing corner cutouts with parallel edges 6, 7 of different lengths parallel to a longitudinal axis of the file and perpendicular edges 8, 9 perpendicular to the longitudinal axis of the file. Parallel edge 6 is longer than parallel edge 7. These parallel edges 6, 7 take up the reaction forces during the forestroke of the file and perpendicular edge 9 serves as a seat for the file in the adaptor of the power tool. The fitting 4 further has a hole 10 near perpendicular edge 9, so that the file can be attached to the power tool (not shown) with a bolt. This bolt provides for the reaction on the backstroke of the filing action. The edges of the fitting are shaped to be compatible with the adaptor of the power tool on which the file is to be used. As a note, such power tools are usually equipped with a set screw that secures the bolt holding the file in the adaptor. The fitting 4 is designed to sustain any mechanical loads acting on the file.

FIG. 2 shows a bottom view of the file as shown in FIG. 1. Flank 3 is dressed or hewn on the outer side and has a straight profile. It is thus shaped as a machining file.

FIG. 3 is a rear view of the file as shown in FIG. 1. The inner side 11 of flank 2 is smooth. The straight edge 12 of flank 3, shaped as a machining file, however, is dressed or hewn and thus serves as a groove file. The rounded edge that joins flanks 2, 3 is also dressed or hewn and serves as a round file. The file as a whole thus serves as a multifunction filling tool, with an incorporated hand-held file-profile formed by flank 2. A machining file is formed by flank 3, a round file formed by the radius 5 and a groove file is formed by the edge 12 of flank 3. The orientation of the dressing or teeth of the file implies that the filing action occurs on the forward stroke of the tool. The action is thus equivalent to that of a manual file.

Its versatility makes this file the ideal tool for a broad range of applications. Its shape and dimensions allow its use in situations where a part is not easily accessible, and a sanding machine can not practically be used. When a power tool with variable stroke is used, the file applies itself well on small parts or sections that can only be worked with the file tip.

Figure 5:
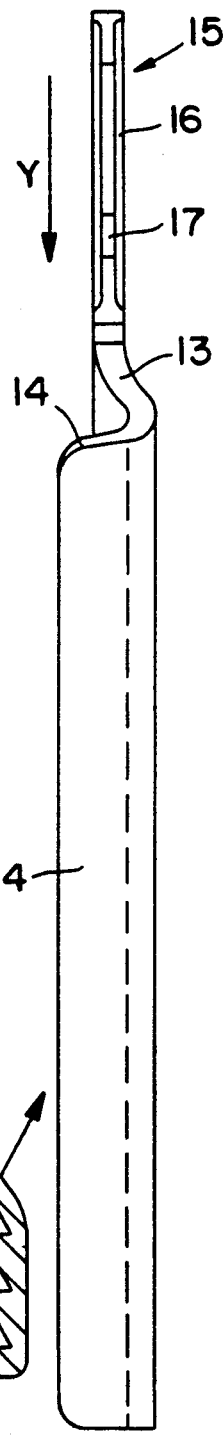
FIG. 5 is a front view of the fitting, as seen in the direction of arrow Y, as shown in FIG. 4.
Figure 6:
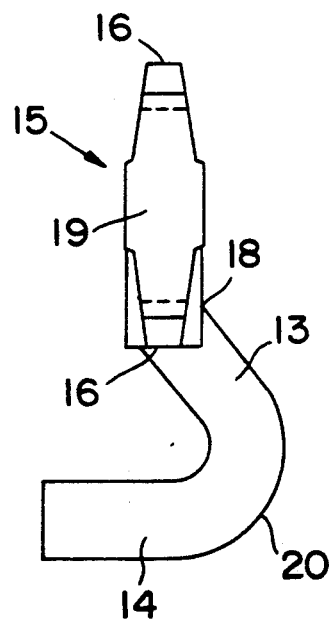
FIG. 6 is a bottom view of the rasp, as seen in the direction of arrow Y as shown in FIG. 4.

FIGS. 4 to 6 show a wood rasp designed according to one embodiment of the invention. FIG. 4 shows a side view of the tool. The rasp, just like the file, consists of an L-shaped profile with two flanks 13, 14. Here as well, the end of the longer flank 13 forms a fitting 15. This fitting, however, is designed somewhat differently from that on the file, in view of its adaptation to and use on a power jigsaw. The fitting 15 is designed with two opposing projections 17 on its edges 16. The cross-section of the fitting is slightly tapered toward its edges and its profile is strongly tapered at its end. The adaptor on the power-jigsaw is cylindrical in shape and has, on its inner side, a longitudinal slit into which the fitting of the rasp can be inserted. The cylinder with the inserted fitting is turned 90 degrees, so that the projections 17 are brought against a pair of bolts on the inside of another cylinder. The projections 17 on the fitting 15 are then fixed against these bolts with a screw to firmly secure the rasp in the adaptor of the power saw. Flank 13 of the rasp is narrower at its tip to allow work in more limited spaces.

FIG. 5 is a front view of the rasp. FIG. 5a shows an enlarged view of the orientation of the hewn teeth and the cutting action, unlike with the file, is on the backstroke of the tool.

FIG. 6, shows a bottom view of the rasp from the end of the fitting, in direction of arrow Y as seen in FIG. 5. FIG. 6 shows an angle of about 50 degrees between the two flanks 13, 14. The longer flank 13 is bent about 40 degrees as seen at 18, toward the free edge and as a result, its prolongation 19 which forms the fitting 15 is at a right angle to the other flank 14. Also shown in FIG. 6, the fitting is tapered toward its edges 16 along its entire length. Both flanks 13, 14 and the adjoining rounded part 20 are dressed or hewn. This gives the rasp a widened versatility and ease of use in otherwise hard-to-reach situations. Of course, the rasp can be equipped with a fitting similar to that on the file and vice-versa, so that the file can be used on a power jigsaw and the rasp on a power pad saw.

The file and the rasp as presented in the invention can in many cases replace sanding machines whose bulk make them inappropriate for applications in reduced spaces or on parts with reduced access. Pieces or parts thereof which could not be worked effectively up to now because traditional files could not be held properly or because the space did not allow a full movement of the tool can now be processed comfortably and efficiently with the new file and rasp as presented in this invention.

I claim:

1. A file comprising: a body having an L-shaped cross-section (1) transverse to a longitudinal axis of said file, said L-shaped cross-section having two flanks (2, 3; 13, 14) arranged at an angle with respect to each other, a first said flank (2; 13) being longer than a second said flank (3; 14); a protruding part forming a fitting (4; 15); said fitting (4; 15) attachable to an adaptor of a mechanical power tool; said fitting (4) having two opposing corner cutouts having parallel edges (6, 7) of different lengths in a direction parallel to said longitudinal axis disposed at a fitting end of said fitting away from said body, said corner cutouts having a first perpendicular edge (8) perpendicular to a first said parallel edge (6) and a second perpendicular edge (9) perpendicular to a second said parallel edge (7) proximate a file end of said file adjacent said fitting; said first parallel edge (6) being longer than said second parallel edge (7); and said fitting (4) having a hole (10) proximate said second perpendicular edge (9) to attach said file to said mechanical power tool with a bolt.

2. A file according to claim 1, wherein said fitting (15) has two opposing projections (17) positioned on fitting edges (16) of said file and said fitting (15) is slightly tapered toward said fitting edges (16).

3. A file according to claim 2 wherein an outer angle formed by said two flanks (2, 3; 13, 14) is rounded and said two flanks (2,3; 13, 14) have one of a hewn file and a rasp surface.

4. A file according to claim 3 wherein said angle between said flanks (2, 3) forms a profile (1) that is approximately 90 degrees.

5. A file according to claim 3 wherein said angle between said flanks (13, 14) forms a profile (1) that is about 50 degrees; a first said flank (13) has about a 40 degree (18) bend toward a first free edge; and an extension (19) which forms said fitting (15) is at a right angle to a second said flank (14).

6. A file according to claim 5 wherein said first free edge of said first flank (2) is tapered toward an end of said first flank (2) which starts at an angle in said first free edge.

7. A file according to claim 6 wherein said first free edge of said first flank (13) is curved and forms a hand-held file-profile, a second free edge of said second flank (14) is straight and forms a machining file, and an outer, hewn radius (5) forms a round file.

8. A file according to claim 7 wherein a flank edge (12) of said second flank (3) is hewn and forms a groove file.

9. A file according to claim 6 wherein said extension (19) of said first flank (13) is at a right angle with respect to said second flank (14) and extends from said fitting (15) to only half a length of said second flank (14).

10. A file according to claim 1 wherein an outer angle formed by said two flanks (2; 3; 13; 14) is rounded and said two flanks (2,3; 13, 14) have one of a hewn file and a rasp surface.

11. A file according to claim 1 wherein said angle between said flanks (2, 3) forms a profile (1) that is approximately 90 degrees.

12. A file according to claim 1 wherein said angle between said flanks (13, 14) forms a profile (1) that is about 50 degrees; a first said flank (13) has about a 40 degree (18) bend toward a first free edge; and an extension (19) which forms said fitting (15) is at a right angle to a second said flank (14).

13. A file according to claim 1 wherein said first free edge of said first flank (13) is curved and forms a handheld file-profile, a second free edge of said second flank (14) is straight and forms a machining file, and an outer, hewn radius (5) forms a round file.

14. A file according to claim 12 wherein said extension (19) of said first flank (13) is at a right angle with respect to said second flank (14) and extends from said fitting (15) to only half a length of said second flank (14).

15. A file according to claim 1 wherein a first free edge of said first flank (2) is tapered toward an end of said first flank (2) which starts at an angle in said first free edge.

16. A file according to claim 1 wherein has a flank edge, said flank edge being said second flank (3) is hewn and forming a groove file.

* * * * *